United States Patent [19]

Patriquin

[11] Patent Number: 4,820,916
[45] Date of Patent: Apr. 11, 1989

[54] OPTICALLY POWERED SENSOR SYSTEM

[75] Inventor: Douglas R. Patriquin, Middlebury, Vt.

[73] Assignee: Simmonds Precision Products, Tarrytown, N.Y.

[21] Appl. No.: 46,075

[22] Filed: May 5, 1987

[51] Int. Cl.$^4$ .......................... H01J 5/16; G01D 5/34
[52] U.S. Cl. ................................ 250/227; 250/231 R; 455/612
[58] Field of Search ............... 250/231 R, 231 P, 227, 250/551; 350/96.15, 96.16, 96.17; 455/602, 605, 606, 607, 608, 610, 612, 617, 613

[56] References Cited

U.S. PATENT DOCUMENTS

| | | | |
|---|---|---|---|
| 4,281,253 | 7/1981 | Culver | 250/551 |
| 4,290,146 | 9/1981 | Adolfsson et al. | 455/613 |
| 4,346,478 | 8/1982 | Sichling | 455/612 |
| 4,436,365 | 3/1984 | Hodgins | 350/96.16 |
| 4,490,606 | 12/1984 | Lockett et al. | 250/227 |
| 4,511,208 | 4/1985 | Ozeki et al. | 455/606 |
| 4,525,873 | 6/1985 | Baues | 455/612 |
| 4,526,027 | 7/1985 | Franklin | 73/1 H |
| 4,641,025 | 2/1987 | Miller | 250/227 |
| 4,651,571 | 3/1987 | McGlade | 250/227 |

Primary Examiner—David C. Nelms
Assistant Examiner—Michael Messinger
Attorney, Agent, or Firm—Cushman, Darby & Cushman

[57] ABSTRACT

An optically powered sensor system includes a plurality of sensors connected to a system optical bus that communicates with a system controller. Optical energy is transmitted along the bus for distribution to all sensors in the system with return pulses from the various sensors transmitted on the bus to the system controller. Each sensor includes a photodiode array for converting optical energy transmitted system-wide by the controller into electrical energy for storage in a storage capacitor associated with each sensor. A transducer, such as a thermistor, and a fixed-value reference, such as a resistor, are connected to a pulse encoder and, in response to power switched from the capacitor, the pulse encoder produces a series of short-duration pulses having a pulse spacing that is dependent upon the fixed value of the reference and the parameter-affected value of the transducer. The pulses are used to drive an optical source for transmitting optical pulses from the sensor to the system controller. The parameter value is determined by multiplying the known value of the reference resistor by a time factor ratio which is related by the reference pulse timing and the parameter-affected pulse timing. An optical sensor system is provided in which the measurement of a parameter by each sensor is immune to variations in the electrical components at each sensor.

17 Claims, 3 Drawing Sheets

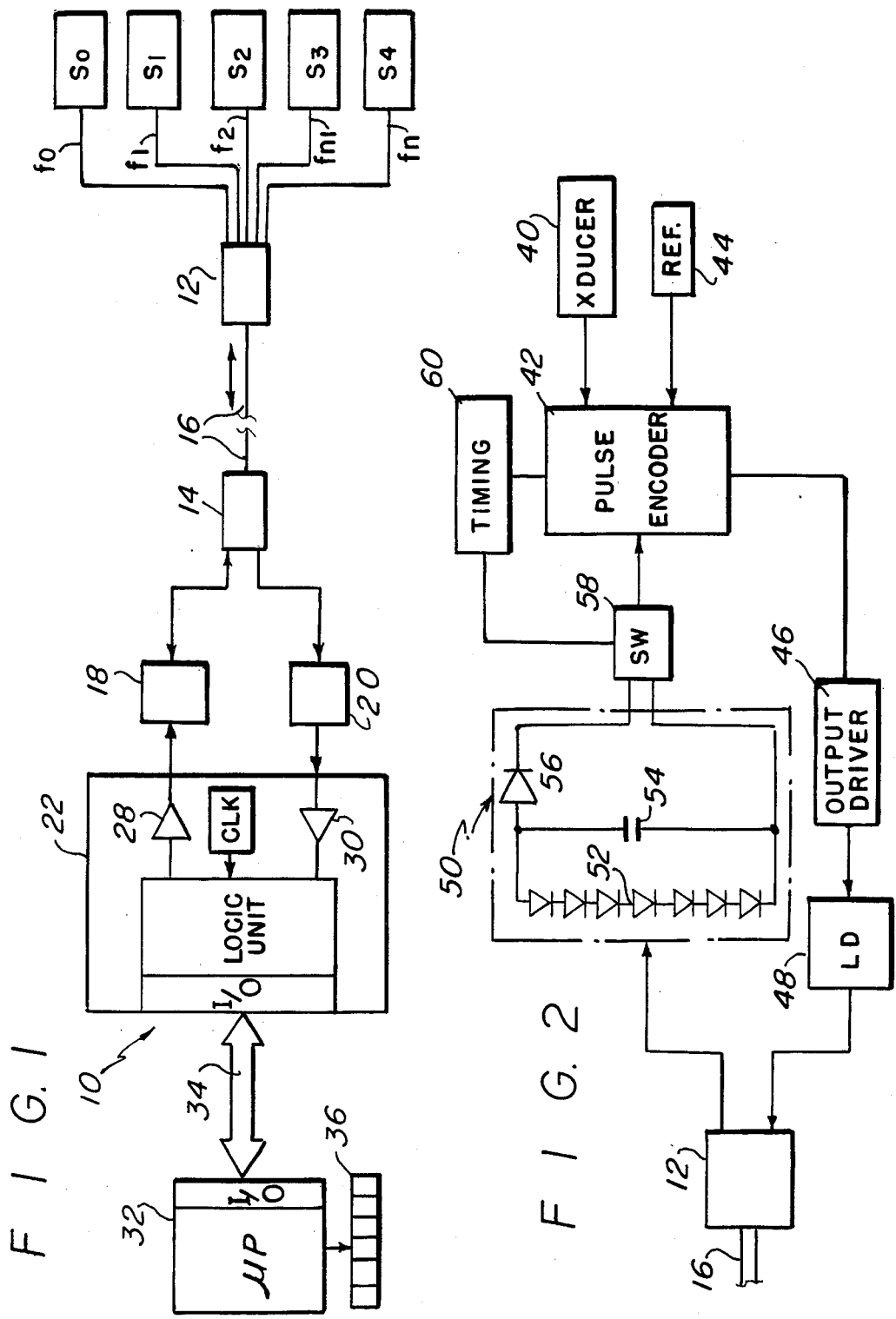

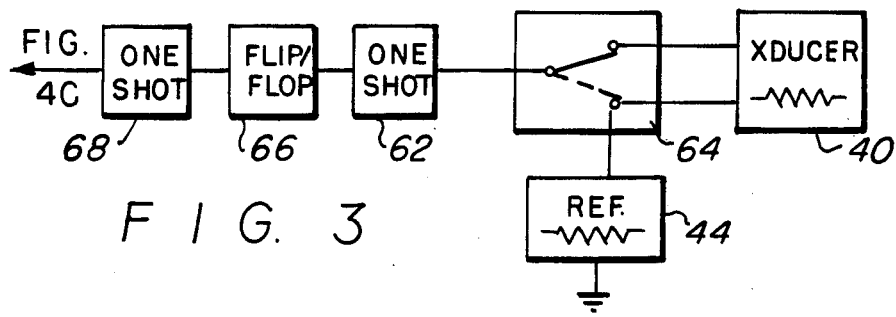
FIG. 3
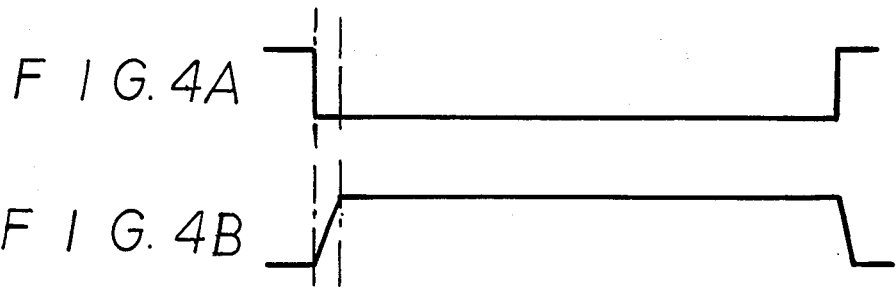
FIG. 4A
FIG. 4B
FIG. 4C
FIG. 4D
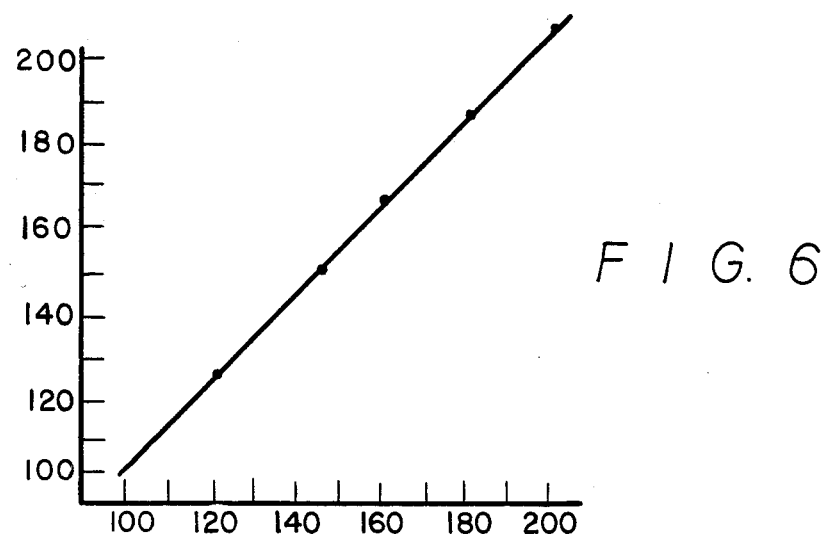
FIG. 6

OPTICALLY POWERED SENSOR SYSTEM

BACKGROUND OF THE INVENTION

The present invention relates to devices and systems for sensing physical parameters, and, more particularly, to optically powered sensors and sensing systems in which optical energy from a source is provided to one or more sensors which, in turn, provide information-bearing optical energy representative of the sensed parameter.

Various types of sensors and sensor systems are known for measuring physical parameters. Traditionally, electrical sensors which provide a variation in resistance, capacitance, or other electrical characteristics as a function of a sensed physical parameter have been used to provide an electrical current or voltage output. For example, the resistance of a thermistor varies as a function of its temperature and can be used in a simple bridge circuit to provide a temperature responsive output current. In a similar manner, capacitors and capacitor-like structures can be used to provide electrical signal outputs that are responsive to environmental parameters that affect the dielectric constant of the capacitor. In a system or network context, groups of sensors are typically interconnected with a controller which provides source electrical power to the various sensors and measures or otherwise senses the parameter-affected electrical characteristic. In general, electrical sensors and electrical interconnections represent highly developed and reliable technology, although unshielded systems can be subject to electromagnetic interference (EMI).

With the advent of optical fibers, sensor systems using optical fibers to transmit information from one node in a network to another have been developed or proposed. Optical fiber transmission is best suited to digitally encoded optical pulses in which the information to be conveyed is encoded by varying an attribute of the pulse, such as the pulse width, amplitude, or repetition rate. Efforts directed to the transmission of analog light through optical fibers is less than optimal because of the substantial variation in attenuation for the transmitted energy as a consequence of the fiber temperature, external pressure applied to the fiber, the presence of small-radius bends in the fiber, and the cumulative effects of defects in the fiber.

In view of the highly developed state of traditional electrical sensors and the advantages attendant to pulse transmission in optical fibers, an optimal system can be achieved using traditional electrical sensors with optical fiber interconnection. In general, however, the need to power the electrical sensors requires separate electrical power paths to the sensors and thus adds undesired complexity to the overall system.

In one optical sensor system, as disclosed in U.S. Pat. No. 4,346,478 to Sichling, optical energy is transmitted via optical fibers to a sensor which includes a photodetector and a storage capacitor for converting the input optical energy to electricity for storage in the capacitor. A transducer, such as a temperature sensor, uses the stored electrical energy to provide an electrical output to a pulse width modulator, such as a light emitting diode or a laser diode, to transmit one or more return pulses indicative of the measured parameter. While the Sichling system operates to provide duration-modulated pulses, the overall accuracy of the measurement is a function of the stored energy and the accuracy can degrade with changing characteristics of the storage capacitor, as can occur, for example, with changes in temperature and component aging. In additional, the use of pulse width modulation requires that the light emitting diode or laser diode be powered during the transmission of the entire pulse. In the context of low-power systems, the optical energy emitter can consume the major portion of the available stored energy and represent a constraint to efficient operation.

SUMMARY OF THE INVENTION

In view of the above, it is an object of the present invention, among others, to provide an optical sensor and sensing system in which optical energy is stored as electrical energy for use in sensing a measurable parameter.

It is another object of the present invention to provide an optical sensor and sensing system in which optical energy is stored as electrical energy for use in sensing a measurable parameter and in which an optical signal is generated as a function of the measured parameter.

It is still another object of the present invention to provide an optical sensor and sensing system in which optical energy is stored as electrical energy for use in sensing a measurable parameter and in which an optical signal is generated as a function of the measured parameter and as a function of a reference value.

It is a still further object of the present invention to provide an optical sensor and sensing system for sensing a measurable parameter and providing an optical pulse signal as a function of the measured parameter and a reference value in which the reference value serves as a basis for determining the measured value.

It is a still further object of the present invention to provide an optical sensor and sensing system for sensing a measurable parameter and providing an optical pulse signal as a function of the measured parameter and a reference value in which optical pulse generation occurs in an energy efficient manner.

In view of these objects, and others, the present invention provides an optically powered sensor and system for measuring various parameters and providing an optical signal representative of the measured parameter. The optically powered system includes at least one sensor having a power converter for converting optical energy to electrical energy for storage in an electrical storage device, such as a capacitor, associated with the sensor. A transducer, such as a thermistor, and a reference unit, such as a fixed-value resistor, is associated with each sensor. Electrical current provided by the storage device is provided through the transducer and the reference and controls a pulse encoder to provide output electrical pulses that are a function of the fixed-value reference and the parameter-affected measure value. The pulse output, in turn, drives an optical energy source to provide optical pulses having an attribute representative of the fixed-value reference and the measured-parameter affected value of the transducer.

In a preferred embodiment, an optically powered sensor system includes a plurality of sensors connected to a system optical bus that communicates with a microprocessor controlled system controller. The system controller transmits optical energy along the bus for system-wide distribution to all sensors in the system and receives return pulses from the various sensors, the return pulses including information as to the measured parameter value sensed by the sensor and to a sensor specific reference value. Each sensor incudes a photodiode array for converting optical energy transmitted system-wide by the controller into electrical energy for storage in a capacitor associated with each sensor. A transducer, such as a thermistor, and a fixed-value reference, such as a resistor, are connected to a pulse encoder. In response to power switched from the capacitor, the pulse encoder produces a series of short duration pulses having a pulse spacing that is dependent upon the fixed value of the reference and the parameter-affected value of the transducer. The pulses are used to drive an optical source for transmitting corresponding short duration optical pulses from the sensor to the system controller. The parameter value is determined by multiplying the known value of the reference resistor by a time factor ratio that is related to the reference pulse spacing and the parameter-affected pulse spacing.

In a multi-sensor system, each sensor is provided with sensor-specific time delay prior to the transmission of return pulses from the sensor to the system controller to allow a predetermined 'time window ' for each of the sensors to effect transmission to the central controller. The various sensors of the system thus transmit return pulses in a predetermined time-multiplexed sequence.

The present invention advantageously provides an optically powered sensor system in which the value of the measured parameter is obtained as a function of the reference value, and, accordingly, the measurement of the parameter is independent of the energy storage device used in each sensor and is also relatively immune to component value drift. The use of short duration return pulses minimizes the power requirement of the optical energy generator at the sensor and results in substantial efficiency gains for the system.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is an overall schematic diagram of an optical sensor system in accordance with the present invention;

FIG. 2 is a schematic block diagram of an exemplary sensor in accordance with the present invention;

FIG. 3 is a functional block diagram of a pulse code modulator for providing pulses having attributes representative of a measured value and a reference value;

FIGS. 4A to 4D represent a pulse chart illustrating the sequence of operations for the sensor system of FIG. 1;

FIG. 6 illustrates the linear correspondence for an output value relative to a measured value input.

DESCRIPTION OF THE PREFERRED EMBODIMENT

Figure 5:
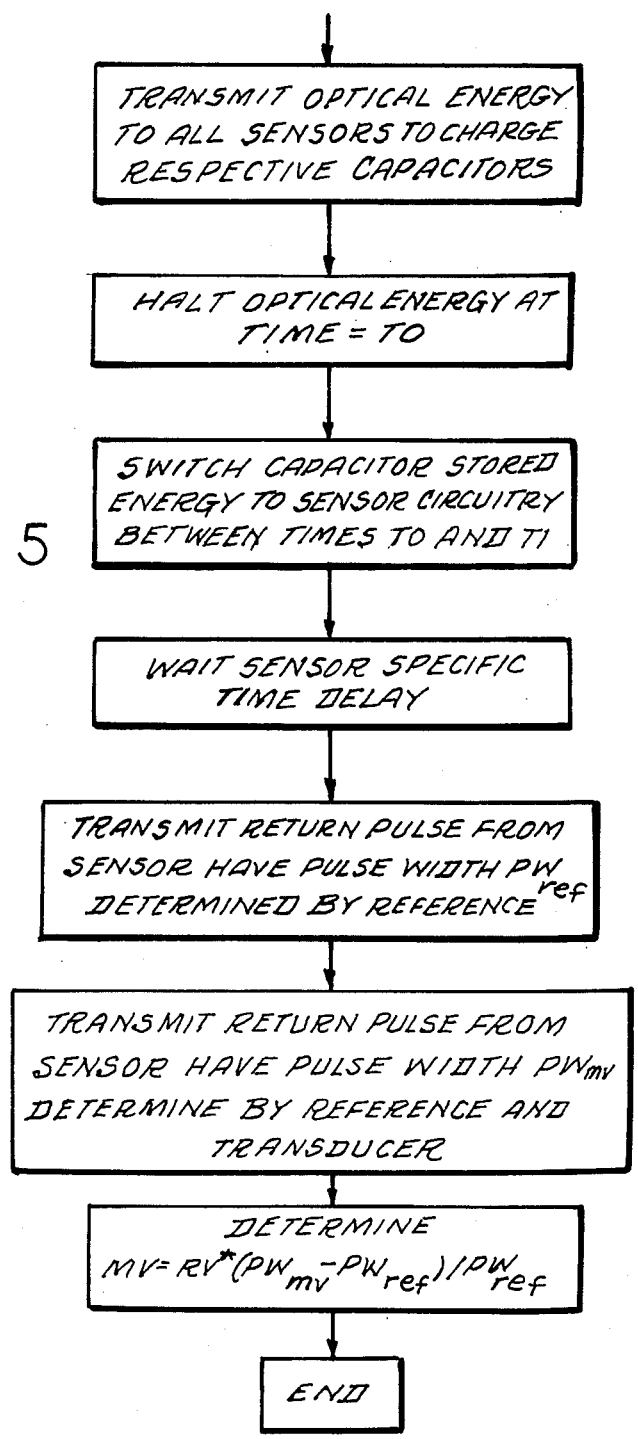
FIG. 5 is a flow diagram of the control sequence for the sensor system to obtain the measured-value and reference-value pulses of FIGS. 4A to 4D.

An optically powered sensor system is shown in schematic form in FIG. 1 and is designated generally therein by the reference character 10. As shown, a plurality of sensors $S_O, S_1, \ldots S_{n-1}, S_n$ are connected by respective optical fibers $f_O, f_1, \ldots f_{n-1}, f_n$ to a distribution coupler 12, which, in turn, is connected to another coupler 14 through an optical fiber bus 16. The coupler 14 is designed to distribute optical energy from the bus 16 to the respective sensors $S_n$ and, conversely, direct optical energy from the sensors $S_n$ along the bus 16 to the coupler 14. An optical source 18, such as a laser diode, is connected to the coupler 14 and directs optical energy into the coupler 14 for transmission via the bus 16 to the coupler 12 and system-wide distribution to the various sensors $S_n$. In an analogous manner, an optical energy receiver 20, such as PIN diode, is connected to the coupler 14 and converts optical energy provided from the sensors $S_n$ through the bus 16 into corresponding electrical signals. The couplers 12 and 14 can take the form of star-type couplers or lateral couplings.

A system controller 22 is connected to the optical source 18 and the optical receiver 20 and functions, as described below, to drive the optical source 18 to introduce optical energy into the system and to process the return signals from the optical receiver 20. The controller 22 includes a logic unit 24 that operates through a recurring cycle under the control of a clock 26 to provide current through a drive amplifier 28 to cause the optical source 18 to direct optical energy through the coupler 14 and the bus 16 to the coupler 12 and the various sensors $S_n$. Additionally, an amplifier 30 accepts pulse signals from the optical receiver 20 for presentation to the logic unit 24. The controller 22 operates under the general control of a micro-processor 32 with communication provided through a bus 34 and respective I/O ports (unnumbered). An output device 36, such as a multi-digit display, is connected to the micro-processor 32 and provides output information as to the parameters sensed by the sensors $S_n$.

The organization of a sensor $S_n$ is shown in functional block form in FIG. 2. As shown, each sensor $S_n$ includes a transducer 40 that has a characteristic, such as resistance, which changes in a predictable manner with the sensed parameter. A pulse encoder 42 is connected to the transducer 40 and to a fixed-value reference 44 and provides a pulse output, as described more fully below, to an output driver 46 which, in turn, drives a laser diode 48 to provide optical pulses through the coupler 12 and the bus 16. The transducer 40 can take the from of a thermistor that changes resistance with temperature, and the reference 44 can take the form a precision, fixed-value resistor.

Optical energy provided by the optical energy source 18 through the bus 16 and the coupler 12 is provided to a power converter 50 within each sensor $S_n$ which includes a series-connected array of photodiodes 52 in shunt circuit with a storage capacitor 54 and in series circuit with a diode 56. Optical energy provided through the bus 16 and the coupler 12 is converted to a DC potential by the photodiodes 52 and stored in the shunt-connected capacitor 54. The diode 56 has a low forward voltage drop and serves to isolate the photodiodes 52 and the capacitor 54 from the remainder of the circuitry. A power switch 58 is connected to the power converter 50 and selectively provides power to the pulse encoder 42 under the control of a timing circuit 60. The power switch 58 can take the form of a MOSFET or a gate-triggered thyristor.

The pulse encoder 42 functions to provide a series of pulse signals, as explained below in relationship to FIG. 4, that provide information related to the measured parameter and the reference value provided by the reference 44. As shown in FIG. 3, the pulse encoder 42 includes a one-shot pulse generator 62 that controls a flip-flop 66 which switches between set and reset states with successive pulses provided by the pulse generator 62. The one-shot pulse generator 62 is of the type that provides an output pulse of varying duration in response to an input value, such as an input resistance. A switch 64 is connected to the input of the one-shot pulse generator 62 and is controlled by the timing circuit 60 to connect either the reference 44 to the input of the one-shot pulse generator 62 or the series-connected value of the reference 44 and the transducer 40. The switch 64 can take the form, for example, of an FET that is selectively gated to shunt the transducer 40. Thus, the duration of the pulse output of the one-shot pulse generator 62 is controlled by the switch 64 to be of a first duration controlled by the reference 44 only or a second value controlled by the sum of the values provided by the reference 44 and the transducer 40, which latter value is a function of the measured parameter. The successive pulses of varying duration from the one-shot pulse generator 62 cause the flip-flop 66 to alternate between its binary HI or LO states with each transition. Another one-shot pulse generator 68 is connected to the flip-flop 66 and is triggered on each transition between the set and reset states to produce a fixed, short-duration pulse with each state change.

The optically powered sensor system operates in accordance with the flow diagram of FIG. 5 to sense the measured parameter and provide a pulse sequence, as shown in FIG. 4C, containing information representative of the measured parameter as well as the reference value. As shown in FIG. 5, the system is initialized by transmitting optical energy from the optical energy source 18 through the bus 16 for distribution to all sensors $S_n$ in the system. The photodiodes 52 of each sensor $S_n$ convert the distributed optical energy to an electrical current and charge the capacitor 54 of each sensor $S_n$ to a full charge or near full charge condition. In general, the optical energy provided from the optical source 18 is of a sufficient duration and intensity to assure a sufficient charge in the capacitor 54 of each sensor $S_n$. As shown by the graphs of FIGS. 4A and 4B, the distributed optical energy is halted at time $T_O$ by the controller 22 in response to commands provided from the micro-processor 32. The termination of the distributed optical energy is detected by each sensor $S_n$ and the power switches 58 of each of the sensors $S_n$ are switched to apply power to the remaining sensor circuitry. A current path is provided through the reference 44 of each sensor $S_n$ with the resulting current fixed by the value of the reference 44, and a current path is provided through the respective transducer 40 with the current flow through the transducer 40 responsive to the sensed parameter. For example, where the transducer 40 is a thermistor, current flow provided through the power switch 58 will be determined by the thermistor temperature. Because of capacitive effects, power switching occurs during a time period between $T_O$ and $T_1$, as shown in FIG. 4B. The pulse encoder 42 of each sensor $S_n$ is provide with a sensor specific time delay between time $T_1$ and time $T_2$; in the preferred embodiment, the time delay is 450 microseconds. Thus the time $T_1$ to $T_2$ is 450 microseconds for a first sensor, 900 microseconds for a second sensor, 1350 microseconds for a third sensor, etc. This sensor-specific time delay prior to the transmission of return pulses from the sensor to the system controller to allow a predetermined 'time window' for each of the sensors $S_n$ to effect transmission to the system controller 22. The various sensors $S_n$ of the system thus transmit return pulses in a predetermined time-multiplexed sequence.

At the conclusion of the sensor-specific time delay between time $T_1$ and $T_2$, the pulse encoder 42 is controlled by the timing circuit 60 of the sensor $S_n$ to provide a series of short-duration pulses containing information regarding the value of the sensed parameter. As shown in FIG. 4C, the output of the pulse encoder 42 is normally binary HI at time $T_2$ and switches to binary LO at time $T_3$ and then returns to binary HI at time $T_4$. The transitions at time $T_3$ and time $T_4$ cause successive state changes in the flip-flop 66 and trigger the one-shot pulse generator 68 to provide two successive short-duration pulses $P_1$ and $P_2$ (FIG. 4D) occurring at and spaced by the time difference between time $T_3$ and $T_4$. The pulse spacing between times $T_3$ and $T_4$ is determined by the value of the reference 44 and is relatively fixed for all the sensors $S_n$. After switching to binary HI at time $T_4$, the pulse output remains at binary HI until time $T_5$ when the output switches to binary LO and then returns to binary HI at time $T_6$. The transitions at time $T_5$ and time $T_6$ cause successive state changes in the flip-flop 66 and trigger the one-shot pulse generator 68 to provide two successive short-duration pulses $P_3$ and $P_4$ (FIG. 4D) occurring at and spaced by the time difference between times $T_5$ and $T_6$. The time duration between times $T_4$ and $T_5$ is determined by a combination of the value of the reference 44 and the sensed value of the transducer 40. Accordingly and as explained in more detail below, the pulse spacing between pulses $P_2$ and $P_3$ is a function of the sensed parameter. The output remains at binary LO from time $T_5$ to time $T_6$ at which latter time the output returns to binary HI. The time duration between times $T_5$ and $T_6$ is determined by the value of the reference 44.

The output of the pulse encoder 42 is provided to the output driver 46, which, in turn, drives the laser diode 48 to provide optical return pulses $P_1$, $P_2$, $P_3$, and $P_4$ as shown in FIG. 4D. The optical pulses $P_1$, $P_2$, $P_3$, and $P_4$ have a relatively short duration, that is, on the order of two to eight microseconds, and thus constitute optical spikes rather than pulses having an appreciable duration. The duration of the electrical pulse output of the one-shot pulse generator 68 is appropriate to drive the laser diode 48 to provide the short-duration optical pulses $P_1$, $P_2$, $P_3$, and $P_4$. The timing and spacing of the pulses $P_1$ and $P_2$ are determined by times $T_3$ and $T_4$, and the timing and spacing of the pulses $P_3$ and $P_4$ are determined by the time $T_5$ and $T_6$, and the interpulse duration between pulses $P_2$ and $P_3$ is determined by the pulse $P_2$ at time $T_4$ and the pulse $P_3$ at time $T_5$. The time spacing between the pulses $P_1$ and $P_2$ is representative of the fixed value of the reference 44 while the interpulse duration between the pulses $P_2$ and $P_3$ is representative of the combination of the fixed value of the reference 44 and the parameter dependent value of the transducer 40.

As can be appreciated, the system operates to first transmit optical energy from the controller 22 to all the optical sensors $S_n$ in the system until the respective storage capacitors 54 of each sensor $S_n$ are charged with sufficient energy to perform the sensing function. After cessation of the charging optical energy, each sensor $S_n$ waits a sensor-specific time interval and then returns a series of short-duration pulses with pulses $P_1$ and $P_2$ representative of a reference value, pulses $P_2$ and $P_3$ representative of both the reference value and the measured value, and pulses $P_3$ and $P_4$ representative of the reference value. The inclusion of the reference pulse information allows evaluation of the measured value in the context of a reference that is subjected to the same power converter variables, i.e., the storage capacitors 54, as the transducer 40 so that errors introduced at the sensor $S_n$ by sub-optimal performance of the energy storage function will affect both the reference value determining pulses $P_1$ and $P_2$ and the measured value pulses $P_2$ and $P_3$ and any errors will be effectively cancelled.

The optical pulses returned by the laser diode 48 of each sensor $S_n$ along the bus 16 to the controller 22 and the micro-processor 32 by multiplying the known value of the reference 44 by a time factor ratio which is related by the reference pulse time as presented in equation 1.

$$MV = RV^*(T_{mv} - T_{ref})/T_{ref} \qquad \text{EQ 1.}$$

where

MV = desired measured value
RV = known reference value
$T_{ref}$ = reference value determined from pulse time difference between pulse $P_1$ at time $T_3$ and pulse $P_2$ at time $T_4$
$T_{mv}$ = measured value pulse time difference between pulse $P_2$ at time $T_4$ and pulse $P_3$ at time $T_5$.

The value of the measured parameter is thus obtained as a function of the reference value, and, accordingly, the measured value that is representative of the measured parameter is independent of the capacitance 54 used in each sensor $S_n$ and is also immune to capacitive drift. In computing the spacing for $T_{ref}$, the pulse spacing of the first reference times $T_3$ and $T_4$, the pulse spacing of the second reference times $T_5$ and $T_6$, or the averaged value can be used. Once the measured value MV is determined, the actual value of the measured parameter can be obtained by multiplication by an appropriate scale factor.

The system of FIGS. 1 and 2 has demonstrated substantial linearity in the case of resistance-based transducers. As shown in FIG. 6, sensed input, in Kohms, is relatively linear with the indicated output resistance, also in Kohms.

As can be appreciated, the present invention advantageously provides an optically powered sensor system in which the value of the measured parameter is obtained as a function of a reference value, and, accordingly, the measurement of the sensed parameter is independent of the energy storage device used in each sensor and is also relatively immune to component value drift. The use of short-duration optical pulses results in improved energy utilization in contrast to systems which use pulse width modulation.

Thus it will be appreciated from the above that as a result of the present invention, a highly effective optically powered sensor system is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An optically powered sensor system comprising:
   an optical energy source for transmitting optical energy;
   an optical pathway for conveying the optical energy transmitted by said optical energy source;
   at least one sensor connected to said optical pathway for receiving optical energy from said optical energy source, said sensor including means for converting optical energy from said optical pathway to electricity and storing the electrical energy, a transducer responsive to a selected parameter and having an electrical characteristic that varies as a function of the selected parameter, a reference component having an electrical characteristic that is independent of the selected parameter, circuit means for providing electrical energy from said converting and storing means to said transducer and said reference component and producing a multi-pulse output having a first time attribute that is a function of the electrical characteristic of said transducer and a second time attribute that is a function of the electrical characteristic of said reference component.

2. The optically powered sensor system of claim 1, further comprising:
   means for converting the pulse output of said circuit means to an optical pulse output.

3. The optically powered sensor system of claim 1, further comprising:
   means for converting the pulse output of said circuit means to an optical pulse output and for introducing the optical pulse output onto said optical pathway.

4. The optically powered sensor system of claim 1, wherein said transducer comprises a temperature-responsive resistor and said reference component comprises a fixed-value resistor.

5. The optically powered sensor system of claim 1, wherein said circuit means produces at least a first set of two pulses, the interpulse spacing of which is a function of the electrical characteristic of said transducer, and another set of pulses, the interpulse spacing of which is a function of the electrical characteristic of said reference component.

6. The optically powered sensor system of claim 5, wherein the pulses of said first and second sets of pulses are fixed-duration pulses.

7. The optically powered sensor system of claim 1, wherein said circuit means further comprises a first pulse generator for generating pulses having pulse widths that are a function of the transducer electrical characteristic and of the reference component electrical characteristic and a second pulse generator connected to said first pulse generator for providing fixed-duration pulses in response to the leading and trailing edge transitions of said pulse-width modulated pulses.

8. The optically powered sensor system of claim 7, wherein said circuit means further comprises:
   means for selectively switching electricity from said converting and storing means between said transducer and said reference component.

9. The optically powered sensor system of claim 8, wherein said circuit means further comprises:
   a bi-state latch between said first and second pulse generators, said latch changing state with the leading and trailing edge transitions of the pulse-width modulated pulses to trigger said second pulse generator.

10. An optically powered sensor for sensing a parameter and providing a pulse output representative of the sensed parameter, comprising:

means for converting optical energy to electricity and storing the electrical energy, a transducer responsive to a selected parameter and having an electrical characteristic that varies as a function of the selected parameter, a reference component having an electrical characteristic that is independent of the selected parameter, circuit means for providing electrical energy from said converting and storing means to said transducer and said reference component and producing a multi-pulse output having a first time attribute that is a function of the electrical characteristic of said transducer and a second time attribute that is a function of the electrical characteristic of said reference component.

11. The optically powered sensor of claim 10, wherein said circuit means produces at least a first set of two pulses, the interpulse spacing of which is a function of the electrical characteristic of said transducer, and another set of pulses, the interpulse spacing of which is a function of the electrical characteristic of the reference component.

12. The optically powered sensor of claim 11, wherein the pulses of said first and second sets of pulses are fixed-duration pulses.

13. The optically powered sensor of claim 10, wherein said circuit means further comprises a first pulse generator for generating successive pulses having respective pulse widths that are a function of the parameter-affected electrical characteristic of the transducer and of the electrical characteristic of the reference component and a second pulse generator connected to said first pulse generator for providing fixed-duration pulses in response to the leading and trailing edge transitions of said pulse-width modulated pulses.

14. The optically powered sensor of claim 13, wherein said circuit means further comprises:

means for selectively switching electricity from said converting and storing means between said transducer and said reference component.

15. The optically powered sensor of claim 14, wherein said circuit means further comprises:

a bi-state latch between said first and second pulse generators, said latch changing state with the leading and trailing edge transitions of the pulse-width modulated pulses to trigger said second pulse generator.

16. The optically powered sensor of claim 10, further comprising:

means for converting the pulse output of said circuit means to an optical pulse output.

17. The optically powered sensor of claim 10, wherein said transducer comprises a temperature responsive resistor and said reference component comprises a fixed-value resistor.

* * * * *